(12) United States Patent
Zhao et al.

(10) Patent No.: US 11,835,419 B2
(45) Date of Patent: Dec. 5, 2023

(54) METHOD FOR RAPID ASSESSMENT OF SERVICE LIFE OF HUB BEARING BASED ON MULTIAXIAL RANDOM ROAD LOADING

(71) Applicant: UNIVERSITY OF SHANGHAI FOR SCIENCE AND TECHNOLOGY, Shanghai (CN)

(72) Inventors: Lihui Zhao, Shanghai (CN); Qichen Li, Shanghai (CN); Zhen Wang, Shanghai (CN); Jinzhi Feng, Shanghai (CN); Songlin Zheng, Shanghai (CN); Dawei Gao, Shanghai (CN); Shuo Weng, Shanghai (CN)

(73) Assignee: UNIVERSITY OF SHANGHAI FOR SCIENCE AND TECHNOLOGY, Shanghai (CN)

( * ) Notice: Subject to any disclaimer, the term of this patent is extended or adjusted under 35 U.S.C. 154(b) by 198 days.

(21) Appl. No.: 17/618,890

(22) PCT Filed: Aug. 3, 2021

(86) PCT No.: PCT/CN2021/110327
§ 371 (c)(1),
(2) Date: Dec. 14, 2021

(87) PCT Pub. No.: WO2022/033358
PCT Pub. Date: Feb. 17, 2022

(65) Prior Publication Data
US 2022/0381646 A1    Dec. 1, 2022

(30) Foreign Application Priority Data
Aug. 12, 2020 (CN) .......................... 202010804952.4

(51) Int. Cl.
*G01M 13/04* (2019.01)
*G01M 17/007* (2006.01)

(52) U.S. Cl.
CPC .......... *G01M 13/04* (2013.01); *G01M 17/007* (2013.01)

(58) Field of Classification Search
CPC ........................... G01M 13/04; G01M 17/007
(Continued)

(56) References Cited

U.S. PATENT DOCUMENTS 5,952,587 A * 9/1999 Rhodes ................. G01L 5/0019
73/862.541
2022/0163426 A1* 5/2022 Hou .................... G01M 13/045

FOREIGN PATENT DOCUMENTS

CN    202974824 U    6/2013
CN    106248379 A    12/2016
(Continued)

OTHER PUBLICATIONS

International Search Report in PCT/CN2021/110327, issued by ISA, dated Oct. 20, 2021.
Written Opinion of the International Search Report in PCT/CN2021/110327, issued by ISA, dated Oct. 14, 2021.
Research on Prediction Method of Hub-bearing Service Life under Random Road Load written by Lihui Zhao etc, on Journal of Mechanical Engineering, dated May 20, 2021.
(Continued)

*Primary Examiner* — Eric S. McCall
*Assistant Examiner* — Timothy P Graves
(74) *Attorney, Agent, or Firm* — Zhu Lehnhoff LLP

(57) ABSTRACT

The present invention discloses a method for the rapid assessment of the service life of a hub bearing under multiaxial random road loading, comprising the following steps: acquiring a measured load spectrum of a wheel center of an automobile, and converting the wheel center load into
(Continued)

an axial load and a radial load borne by a hub unit; performing load level division on the axial load and radial load borne by the hub unit, and performing joint distribution counting; according to the deformation coordination relationship between a roller and a raceway of the bearing, establishing a bearing contact model under a joint load, and according to the bearing contact model and the result of joint distribution counting, calculating the actual contact load of the bearing under different loads; and calculating the equivalent dynamic load and the life of the bearing through the actual contact load of the bearing to obtain the total equivalent damage of the bearing. The present invention can accurately and effectively obtain the service life of the hub bearing to provide a reference basis for the design and type-selection, and life prediction of the hub bearing.

9 Claims, 14 Drawing Sheets

(58) Field of Classification Search
USPC ............. 384/448, 512; 73/114.81, 115.07, 73/862.041, 862.53, 862.541
See application file for complete search history.

(56) References Cited

FOREIGN PATENT DOCUMENTS

| | | | |
|---|---|---|---|
| CN | 108595765 A | 9/2018 | |
| CN | 108692938 A | 10/2018 | |
| CN | 109030016 A | 12/2018 | |
| CN | 110059408 A | 7/2019 | |
| CN | 110174261 A | 8/2019 | |
| CN | 110502816 A | 11/2019 | |
| CN | 111159827 A | 5/2020 | |
| CN | 111896255 A | 11/2020 | |
| JP | 2011069684 A | 4/2011 | |
| WO | 2018116092 A1 | 6/2018 | |
| WO | WO-2020199497 A1 * | 10/2020 | .......... G01M 13/045 |

OTHER PUBLICATIONS

First official action and search report based on priority CN202010804952.4, dated Dec. 31, 2020.
Notification of Grant of Invention Patent based on priority CN202010804952.4, dated May 11, 2021.

* cited by examiner

METHOD FOR RAPID ASSESSMENT OF SERVICE LIFE OF HUB BEARING BASED ON MULTIAXIAL RANDOM ROAD LOADING

TECHNICAL FIELD

The present invention belongs to the field of hub unit reliability analysis, and particularly relates to a method for the rapid assessment of the service life of a hub bearing based on multiaxial random road loading.

BACKGROUND

A hub bearing is an important safety component on an automobile, which carries the weight of the vehicle body and provides accurate guidance for the rotation of the hub, realizing an important transition between the vehicle body translation and the wheel rotation. Different from the service conditions of common industrial bearings, the hub bearing in operation not only bears the frequently alternating torque-rotation speed working conditions, but also bears the vehicle body gravity and the complex multiaxial random loading between the tire and the road surface, which has more dynamic impact and higher failure risk. The complexity of the loading also increases the difficulty of force bearing analysis and life prediction of the hub bearing. In the industrial field, the bearing as an easily failure-prone component, has always been the focus of product life analysis. At present, the calculation of bearing life is limited to a specific loading working condition, and the theoretical calculation is carried out by the empirical formula of bearing life, and the complicated loading condition is mainly supplemented by the correction factor. With the method, it is difficult to accurately reflect the bearing life under complex loading working conditions. The bearing equivalent dynamic load calculated according to the empirical formula of the bearing life does not take into account the actual contact load of the roller, which results in a great difference between the actual service life and the theoretical life of the bearing. Therefore, it is necessary to propose a method for rapidly predicting the service life of bearings based on the coupling effect of random road loading.

SUMMARY OF THE INVENTION

In order to solve the problem that it is difficult to accurately reflect the bearing life under complex loading working conditions with the current calculation method of the bearing loading life, the present invention proposes a method for the rapid assessment of the service life of a hub bearing based on multiaxial random road loading, which can complete the hub bearing life calculation under multiaxial random road loading in the test field, and provide a reference for design and type-selection, and service life prediction of the hub bearing.

In order to achieve the above object, the present invention provides the following scheme: the present invention provides a method for rapid assessment of service life of hub bearing based on multiaxial random road loading, characterized in that it comprises the following steps:

acquiring a measured load spectrum of a wheel center of an automobile, and converting wheel center load into an axial load and a radial load borne by a hub unit;
performing load level division on the axial load and radial load borne by the hub unit, and performing joint distribution counting;
according to the deformation coordination relationship between a bearing roller and a raceway, establishing a bearing contact model under a joint load, and according to the bearing contact model and a result of the joint distribution counting, calculating the actual contact load of the bearing under different loads;
and calculating an equivalent dynamic load and life of the bearing via the actual contact load of the bearing, obtaining equivalent total damage of the bearing, and calculating an actual service life of the bearing according to the equivalent total damage.

Preferably, a method for converting the wheel center load into the axial load and radial load borne by the hub unit is that: a vehicle coordinate system is constructed, according to a direction of the vehicle coordinate system, x and z direction loads borne by a wheel are combined into the radial load borne by the hub unit, y direction loads borne by the wheel are combined into the axial load borne by the hub unit, and a bending moment caused by the radial load on the bearing is calculated at the same time.

Preferably, a specific method for the load level division includes: according to a magnitude of the radial load and axial load borne by the bearing, equally dividing the radial load and axial load borne by the bearing into several load levels.

Preferably, according to the result of the joint distribution counting, the action frequency under different loads is counted to obtain the number of rotation turns of the bearing under different load levels.

Preferably, a construction method for the contact model of the bearing is: according to the deformation coordination relationship between a roller and a raceway of the bearing, and an angular displacement of the roller and a dislocation of the raceway under action of bending moment, establishing an equilibrium equation of tapered roller bearing under the action of external load radial force and axial force and bending moment.

Preferably, a calculation process of the actual contact load is: inputting the result of the joint distribution counting into the contact load calculation model, and adopting a numerical value iteration method to solve the contact load calculation model so as to obtain the actual contact load of the bearing under different loads.

Preferably, the equivalent dynamic load and the life are calculated using a modified Lundberg-Palmgren bearing life theoretical method.

Preferably, a calculation method for the bearing equivalent total damage is that: under a condition of a certain equivalent dynamic load, the equivalent damage of the bearing is calculated according to the life of a bearing raceway and the number of operating rotations of the bearing; based on the bearing equivalent damage, the bearing equivalent total damage is calculated using linear damage accumulation theory.

Preferably, the load spectrum of the wheel center of an automobile is obtained by measuring with a six-component force meter installed on a vehicle.

The present invention discloses the following technical effects: the present invention performs joint distribution cycle counting on the multiaxial load of the hub bearing through a measured random road load spectrum; according to the deformation coordination relationship between the roller and the raceway of the bearing and in consideration of the angular displacement of the roller, the contact load calculation model of the outer raceway-roller-inner raceway of the tapered roller bearing is established; the dynamic contact load of the bearing under multiaxial load is obtained by inputting the measured road load data for numerical value solution; based on the modified Lundberg-Palmgren theory, the equivalent dynamic load of the bearing under the actual operation working condition is obtained. The life calculation of the hub bearing under the multiaxial random road loading in a test field is completed by integrating the equivalent dynamic load of the bearing, the result of the joint distribution counting, and the linear damage accumulation criterion. The service life of the hub bearing can be obtained accurately and effectively, which provides a reference basis for the design and type-selection and life prediction of the hub bearing.

BRIEF DESCRIPTION OF THE DRAWINGS

In order to explain the embodiments of the present invention or the technical solutions in the prior art more clearly, the following will briefly introduce the drawings needed in the embodiments. Obviously, the drawings in the following description are only some embodiments of the present invention. For those of ordinary skills in the art, without involving creative efforts, other drawings can be obtained from these drawings.

DETAILED DESCRIPTION OF THE PREFERRED EMBODIMENTS

The technical solutions in the embodiments of the present invention will be clearly and completely described below in conjunction with the accompanying drawings in the embodiments of the present invention. Obviously, the described embodiments are only a part of the embodiments of the present invention, rather than all the embodiments. Based on the embodiments of the present invention, all other examples obtained by one of ordinary skills in the art without involving any inventive efforts are within the scope of the present invention.

To further clarify the above objects, features, and advantages of the present invention, a more particular description of the invention will be rendered by reference to the appended drawings and specific implementation modes.

Figure 1:
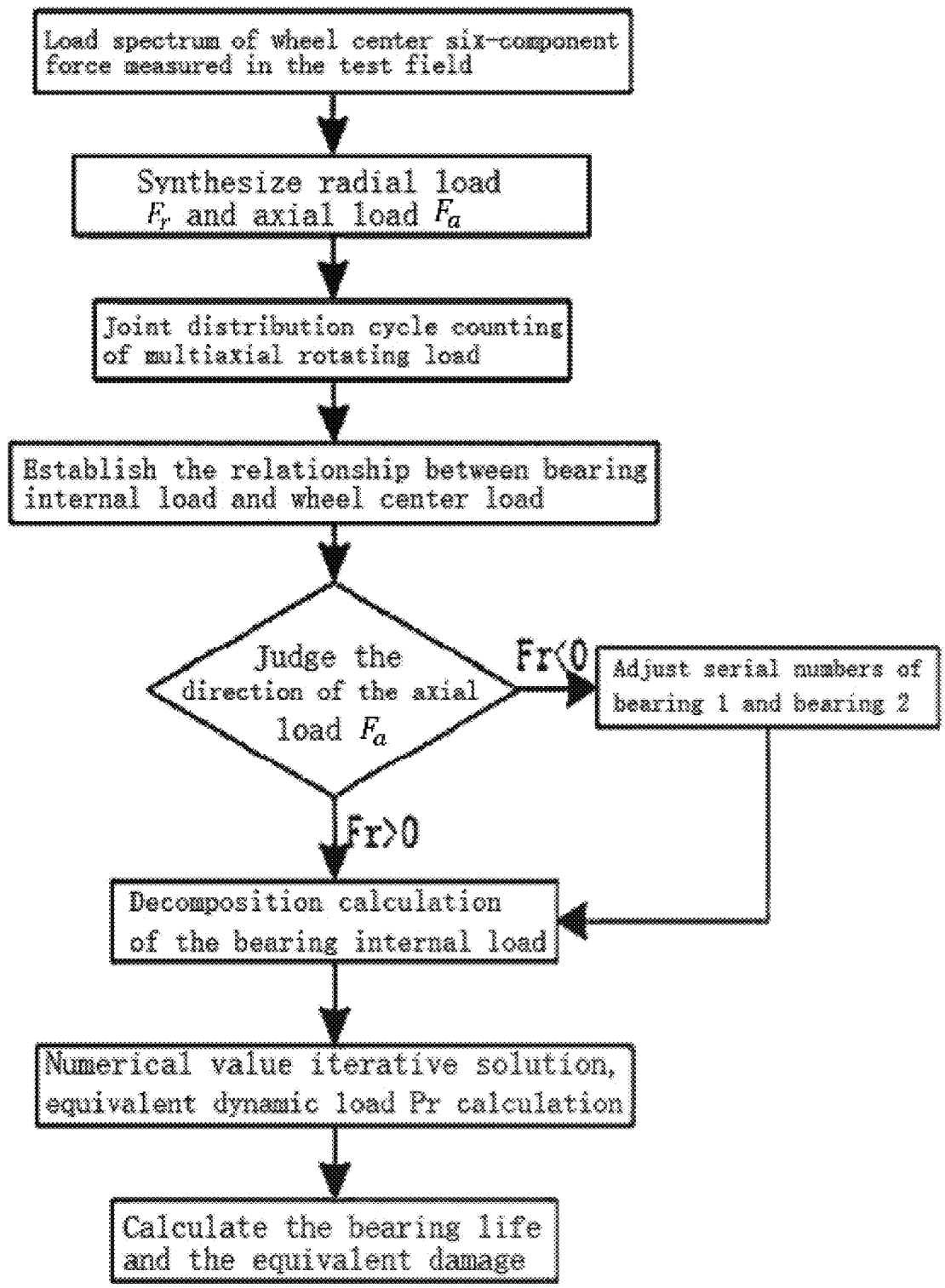
FIG. 1 is a flow chart of a method for the rapid assessment of the service life of a hub bearing according to the present invention.

As shown in FIG. 1, the present invention provides a method for rapid assessment of the service life of a hub bearing based on multiaxial random road loading, including steps as follows.

Figure 2:
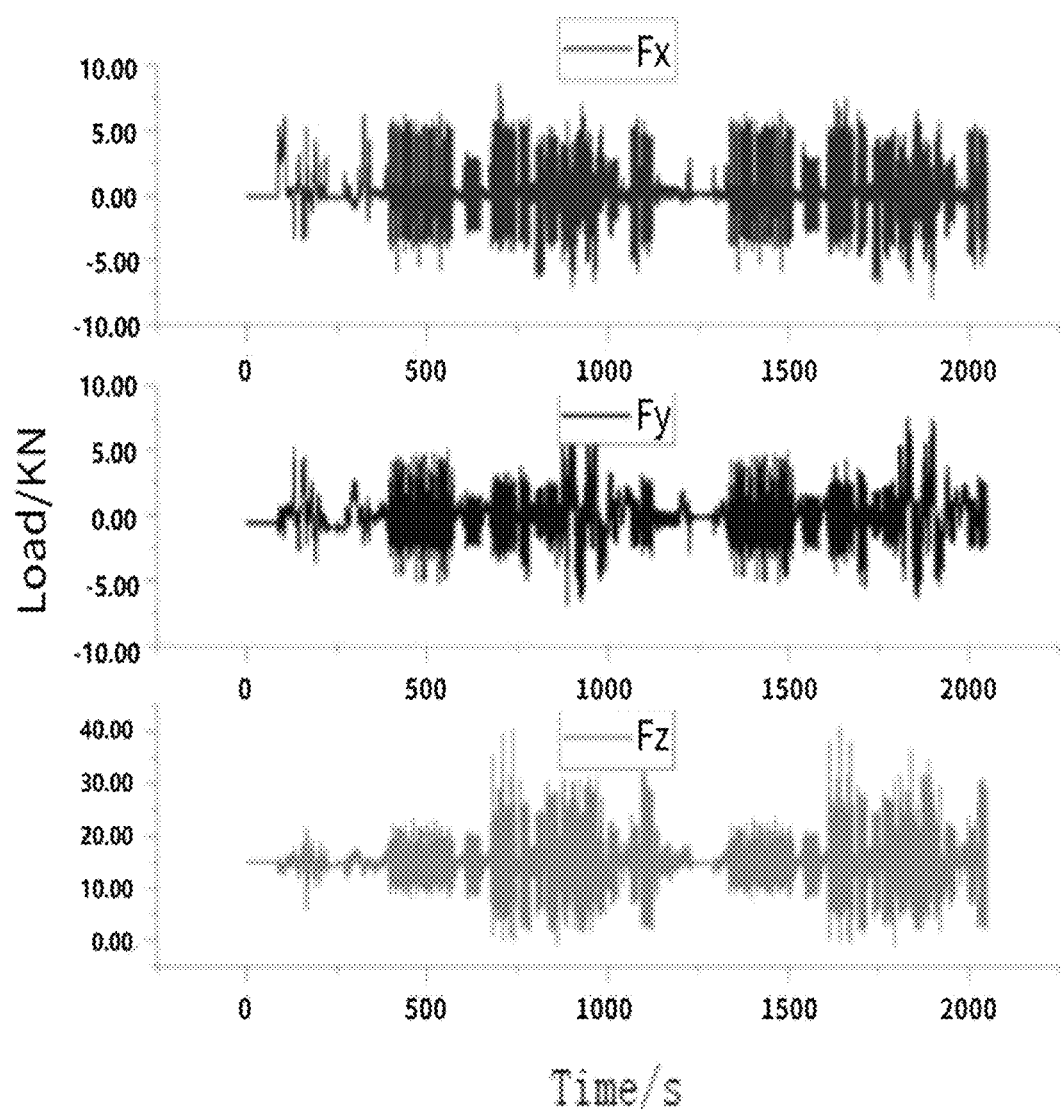
FIG. 2 is a graph showing raw load spectrum data of an automobile measured on a test field according to an embodiment of the present invention.

S1, based on the measured load spectrum of the wheel center six-component force of an automobile in a test field, according to loading characteristics borne by a bearing, the wheel center loading is converted into the radial load and axial load borne by a hub unit. In this embodiment, the raw load data of the test field, as shown in FIG. 2, is used to construct a vehicle coordinate system. According to the direction of the vehicle coordinate system, load $F_x$ and load $F_z$ borne by a wheel are combined into the radial load $F_r$ borne by the hub unit, and the load $F_y$ borne by a wheel is the axial load $F_a$ borne by the hub unit.

Figure 3:
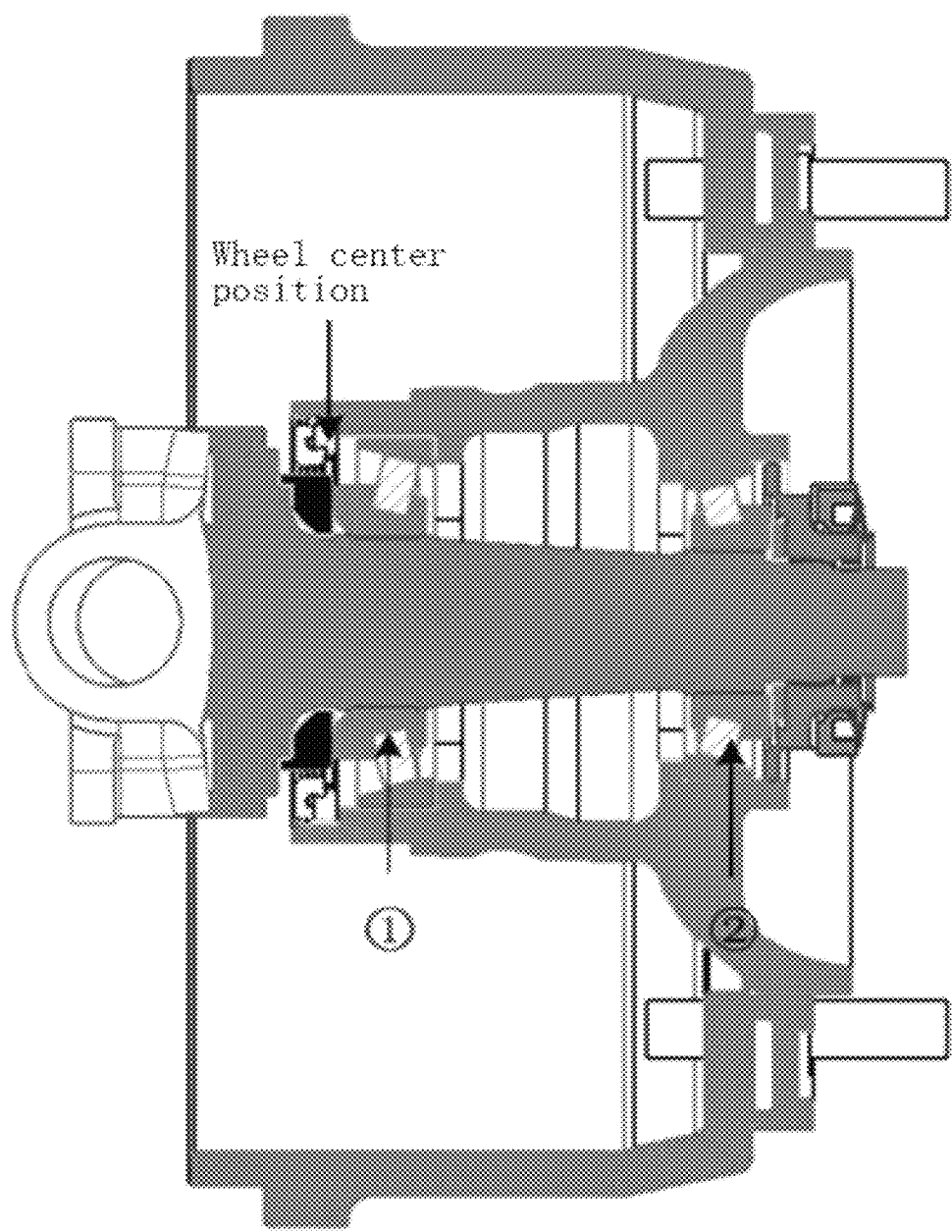
FIG. 3 is a view showing a structure of a bearing hub unit.

The radial load $F_{r1}$, axial load $F_{a1}$, and bending moment M borne by each bearing are obtained by constructing the relationship between the load borne by the hub bearing and the wheel center load $F_r$ and $F_a$. As shown in FIG. 3, the hub unit structure includes two tapered roller bearings in total, with bearing 1 # being model 30313 tapered roller bearing and bearing 2 # being model 30311 tapered roller bearing.

Figure 4:
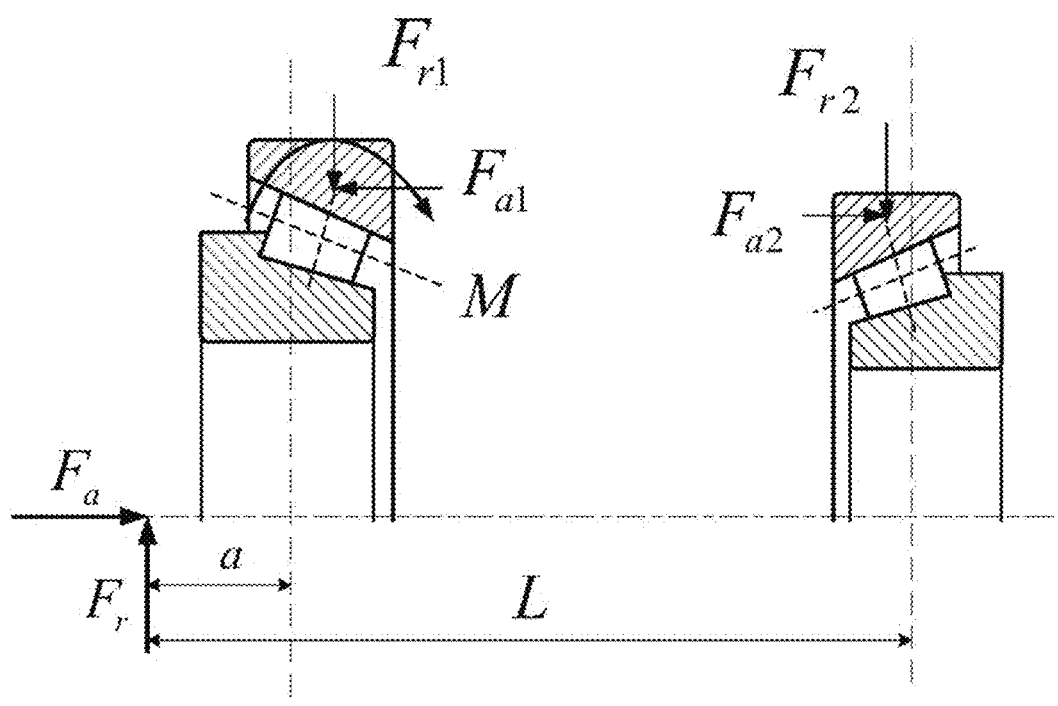
FIG. 4 is a schematic view showing the force bearing of a hub unit.

The force bearing diagram of the hub unit is as shown in FIG. 4, and the radial loads $F_{r1}$ and $F_{r2}$ of the hub bearing obtained from the force equilibrium principle are respectively:

$$\begin{cases} F_{r1} = F_r a/L \\ F_{r2} = F_r + F_r a/L \end{cases} \quad (1)$$

where $F_{r1}$ is the radial load borne by bearing 1 #; $F_{r2}$ is the radial load borne by bearing 2 #; a is the distance from the center of the load to the center of bearing 1 #; L is the wheel diameter.

For tapered roller bearings, the derived axial forces $S_1$, $S_2$ due to radial forces are respectively:

$$\begin{cases} S_1 = F_{r1}/2Y_1 \\ S_2 = F_{r2}/2Y_2 \end{cases} \quad (2)$$

where $S_1$ is the derived axial force borne by bearing 1 #; $S_2$ is the derived axial force borne by bearing 2 #, and $Y_1$ and $Y_2$ are the inherent load coefficients of bearings 1 # and 2 #, respectively.

The value of Y in Equation (2) takes the value when $F_z/F_r > e$.

When $F_a + S_2 > S_1$ then:

$$\begin{cases} F_{a1} = F_a + S_2 - S_1 \\ F_{a2} = S_2 \end{cases} \quad (3)$$

When $F_a + S_2 < S_1$ then:

$$\begin{cases} F_{a1} = S_1 \\ F_{a2} = S_1 - F_a \end{cases} \quad (4)$$

In addition, the bending moment M caused by the radial force $F_r$ on bearing 1 # is:

$$M = F_r a \tag{5}$$

When $F_a$ direction is changed, the serial numbers of bearing 1 # and bearing 2 # are exchanged, and equations (1)-(5) are continued to be used to calculate the internal load of bearings;

where $F_r$ and $F_a$ are the radial force and axial force respectively borne by the hub unit; $F_{a1}$ and $F_{a2}$ are the axial forces borne by bearing #1 and bearing #2, respectively; a is the distance from the center of the load to the center of bearing 11 #; e is a judgment coefficient.

Figure 5:
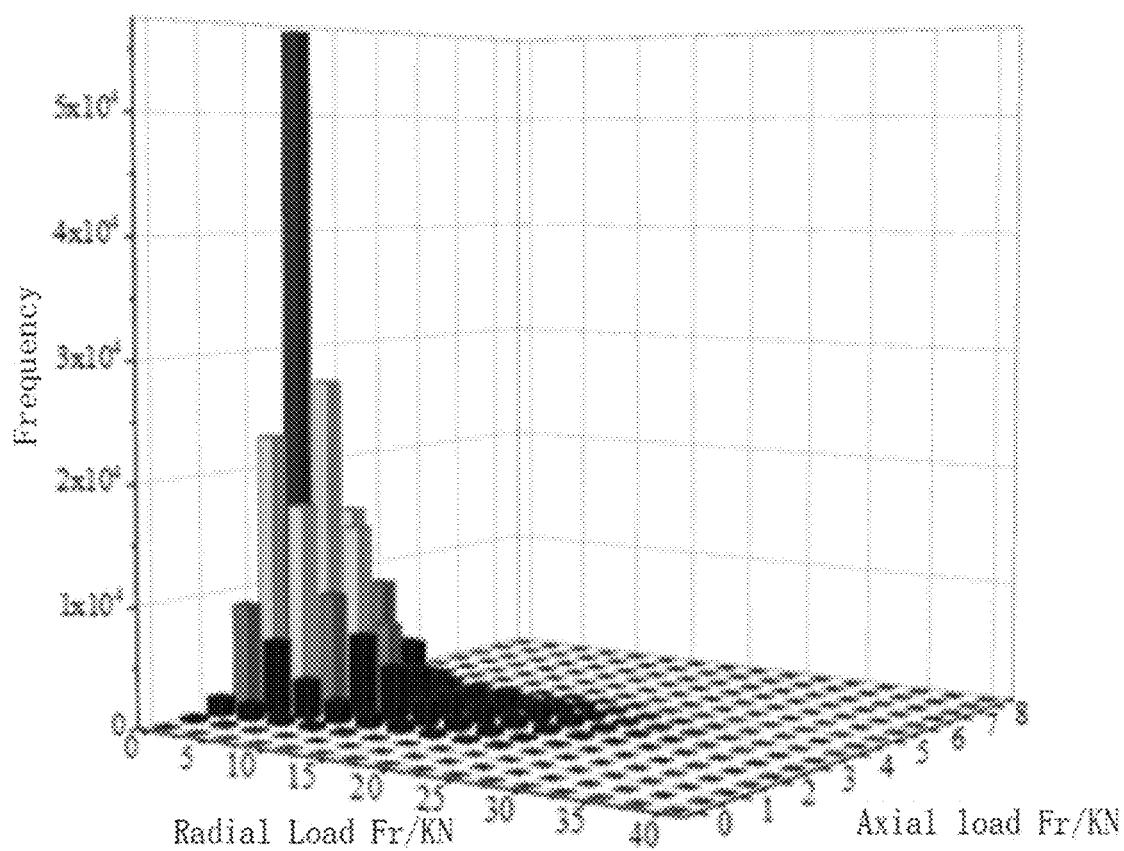
FIG. 5 is a load-frequency distribution histogram after joint distribution counting according to an embodiment of the present invention.

S2, according to the magnitude of the radial load and the axial load borne by the bearing, the radial load and the axial load are respectively divided into 16 load levels on average to perform multiaxial load joint distribution cycle counting, the action frequency under different load levels is counted to obtain the number of rotation turns of the bearing under different load levels, and the load-frequency distribution after counting is as shown in FIG. 5.

S3, according to the deformation coordination relationship between the bearing roller and the raceway, a contact model between the bearing ring and the roller under joint load is established for calculating the contact load between the bearing ring and the roller.

Figure 6:
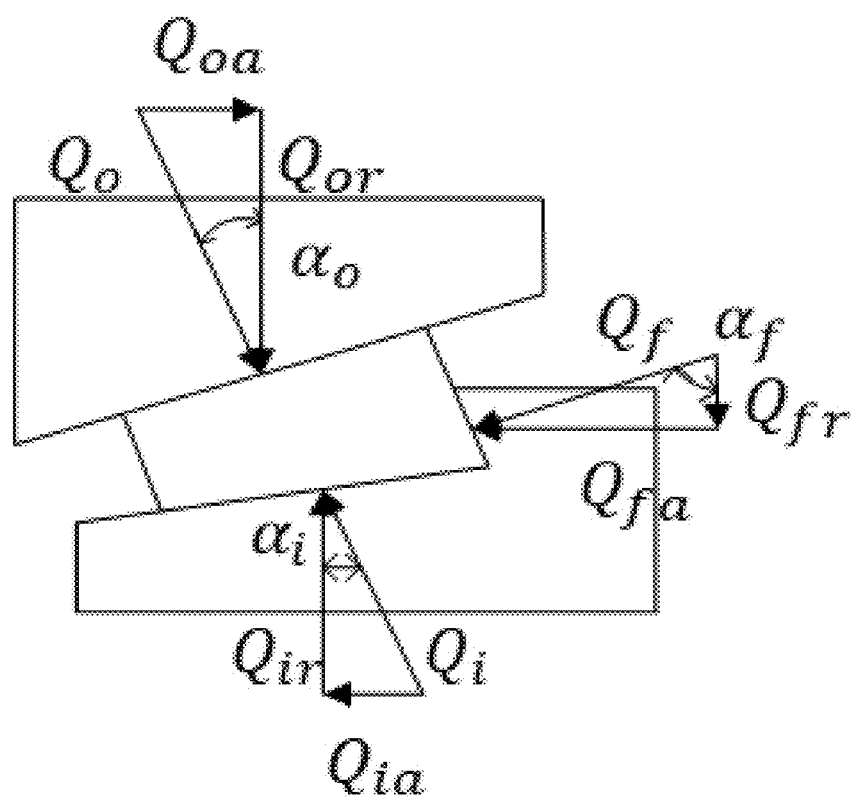
FIG. 6 is a schematic view of a roller loading in a tapered roller bearing.

S31, when the bearing is actually working, the outer ring and the hub are in interference fit; therefore, when the mechanical analysis is performed, the outer ring and the hub are regarded as one body, and the bearing roller and the inner ring are regarded as one body. The roller load in the tapered roller bearing is as shown in FIG. 6, and the maximum rotation speed of the bearing does not exceed 1000 r/min, so the influence of the centrifugal force can be ignored. $Q_o$ and $Q_i$ in the drawing are the contact loads between the roller and the outer raceway, and the roller and the inner raceway, respectively; $Q_f$ is the contact load between the large end surface of the roller and the guiding rib of the inner ring; $\alpha_o$ is the contact angle between the roller and the outer raceway; $\alpha_i$ is the contact angle between the roller and the inner raceway; $\alpha_f$ is the contact angle between the large end surface of the roller and the guiding rib of the inner ring.

The force bearing equilibrium equation of the roller is:

$$Q_o \sin(\alpha_o) - Q_i \sin(\alpha_i) - Q_f \sin(\alpha_f) = 0 \tag{6}$$

$$Q_o \cos(\alpha_o) - Q_i \cos(\alpha_i) + Q_f \cos(\alpha_f) = 0 \tag{7}$$

Taking the contact load $Q_o$ of the outer raceway as an independent variable, then:

$$Q_i = \frac{\sin(\alpha_o + \alpha_f)}{\sin(\alpha_i + \alpha_f)} Q_o \tag{8}$$

$$Q_f = \frac{\sin(\alpha_o - \alpha_i)}{\sin(\alpha_i + \alpha_f)} Q_o \tag{9}$$

When the tapered roller bearing is subjected to joint radial and axial load, the bearing will produce the corresponding radial displacement $\delta_r$ and axial displacement $\delta_a$.

Figure 7:
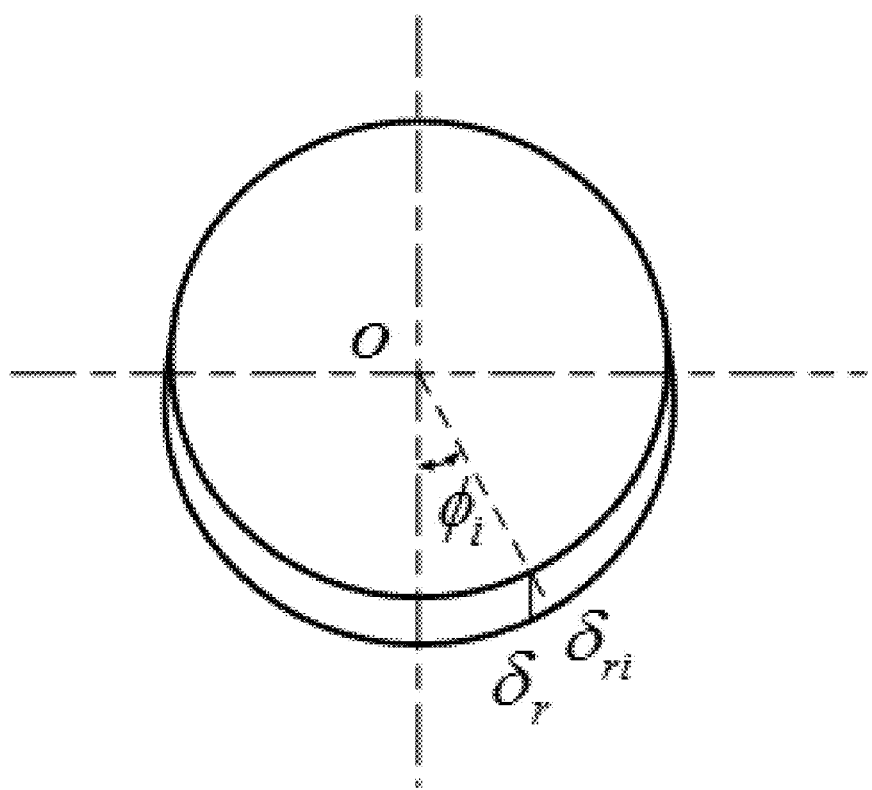
FIG. 7 shows the radial displacement component of a bearing at different angular positions.

As shown in FIG. 7 for the radial displacement components of the bearing at different angular positions, when the bearing produces a radial displacement $\delta_r$, the radial displacement $\delta_{ri}$ of the roller for the angular position $\varphi_i$ is:

$$\delta_{ri} = \delta_r \cos \phi_i \tag{10}$$

When the bearing is under axial load, the axial deformation components of all the rollers are the same, i. e. the axial displacements $\delta_{ai}$ of rollers at different angular positions are equal to the axial displacement $\delta_a$ of the bearing:

$$\delta_{ai} = \delta_a \tag{11}$$

Therefore, for the $i^{th}$ roller, the total displacement $\delta_{ni}$ upward along the outer raceway contact method is (zero clearance after pretension):

$$\delta_{ni} = \delta_{ri} \cos \alpha_o + \delta_{ai} \sin \alpha_o \tag{12}$$

The contact load-displacement relationship between the roller and the outer raceway is:

$$Q_{oi} = K_n \delta_{ni}^{1.11} \tag{13}$$

where: $Q_{oi}$ is the contact load borne by the $i^{th}$ roller; $K_n$ is the contact stiffness coefficient between the roller and the raceway, which is determined by the geometric parameter of the bearing, and the calculation mode is:

$$K_n = 6.24 \times 10^4 l_e^{0.82} D_w^{0.11} [1 + c_i^{0.9} \cos(\alpha_o - \alpha_i)]^{-1.11} \tag{14}$$

where: $D_w$ is the average diameter of the tapered roller; $l_e$ is the effective contact length of the roller, and the calculation formula is:

$$l_e = l/\cos(0.5(\alpha_o - \alpha_i)) \tag{15}$$

where l is the roller length; $c_i$ is:

$$c_i = \frac{\sin(\alpha_o + \alpha_f)}{\sin(\alpha_i + \alpha_f)} \tag{16}$$

Figure 8:
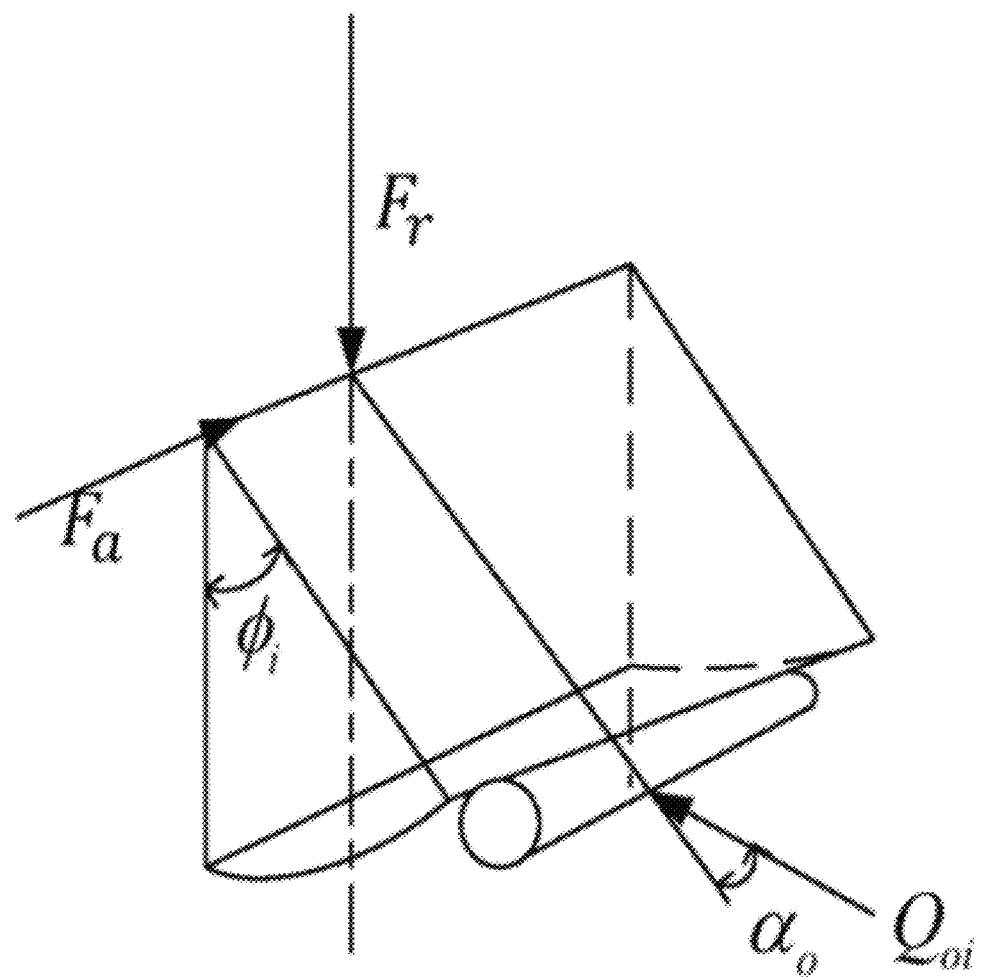
FIG. 8 is a schematic view showing the relationship between the contact load of an outer raceway and an applied load.

The relationship between the contact load of the outer raceway and the applied load is as shown in FIG. 8. The components $Q_{ri}$, $Q_{ai}$ of the contact load in the radial force direction and the axial force direction are:

$$Q_{ri} = Q_{oi} \cos \alpha_o \cos \phi_i \tag{17}$$

$$Q_{ai} = Q_{oi} \sin \alpha_o \tag{18}$$

S32, the above analysis only considers the axial displacement and the radial displacement of the bearing, and for a tapered roller bearing, there is also an angular displacement between the inner ring and outer ring; even if no eccentric phenomenon occurs, the roller will be pressed against a large rib to generate a skew moment; while the concave curvature of the outer raceway will prevent the roller from being skewed, this resistance and the subsequent deformation will change the load distribution between the roller and the raceway, and the roller and the rib. Therefore, when establishing the bearing deformation coordination equation, the angular displacement between the inner ring and outer ring of the bearing also needs to be considered. When calculating, the angular displacement $\gamma$ when the inner ring roller is at 0° is taken as a reference value, then the angular displacement $\gamma_i$ of the rollers at other angular positions is:

$$\gamma_i = \gamma \cos \phi_i \tag{19}$$

Figure 9:
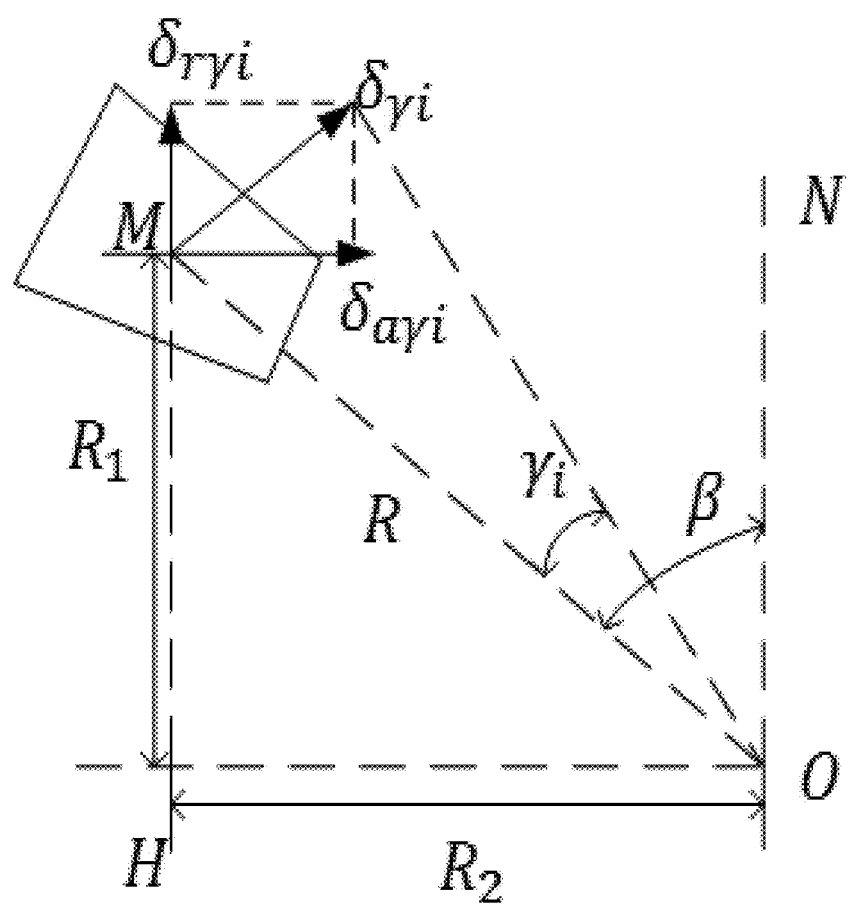
FIG. 9 is a schematic view of the displacement caused by angular displacement.

In FIG. 9, a schematic view of the displacement caused by angular displacement is shown, where point O is the center of two rows of tapered roller bearings; M is the center of the roller; R is the distance from point O to point M; $R_1$ is the distance from the roller center to the bearing rotation center; $R_2$ is the distance between point H and point O; β is the included angle between OM and ON; $\delta_{\gamma i}$ is the total displacement due to angular displacement, and $\delta_{r\gamma i}$ and $\delta_{a\gamma i}$ are the radial displacement component and axial displacement component of $\delta_{\gamma i}$, respectively:

$$\delta_{r\gamma i}=R\gamma_i \sin \beta=R_2\gamma_i \quad (20)$$

$$\delta_{a\gamma i}=R\gamma_i \sin \beta=R_1\gamma_i \quad (21)$$

Furthermore, in the actual use of the hub bearing, in order to improve the bearing performance, a pretension force is applied to the bearing, and the axial predeformation $\Delta$ generated by the bearing pretension force $F_O$ is:

$$\Delta = \left(\frac{F_o}{ZK_n(\sin\alpha_o)^{2.11}}\right)^{0.9} \quad (22)$$

where: Z is the number of rollers.

From the above analysis, the total radial displacement and axial displacement $\delta_{ri}$, $\delta_{ai}$ of the bearing are respectively:

$$\delta_{ri}=\delta_r \cos \phi_i+R_2\gamma_i \quad (23)$$

$$\delta_{ai}=\delta_a+\Delta+\delta_{a\gamma i}+R_1\gamma_i \quad (24)$$

When the bearing is subjected to an external load, the roller contact load will generate a resistance moment to the bearing center, and the resistance moment $M_{ai}$ generated by the axial component of the contact load is:

$$M_{ai}=R_1 \cos \phi_i Q_{oi} \sin \alpha_o \quad (25)$$

The resistance moment $M_i$ generated by the radial component of the roller contact load is:

$$M_{ri}=R_2 \cos \phi_i Q_{oi} \cos \alpha_o \quad (26)$$

The total resistance moment $M_i$ of each roller is:

$$M_i=M_{ai}+M_{ri} \quad (27)$$

In the analysis of single-row tapered roller bearing, an additional bending moment is caused by the angular displacement, which must be taken into account in the calculation. However, when two-row tapered roller bearings are used in pairs, due to the existence of the pretension force, the stiffness of two single-row bearings is much greater than that of one single-row tapered roller bearing, and the unbalanced moment caused by one single-row tapered roller bearing can be eliminated by the other. Therefore, in the analysis, the single-row tapered roller bearings used in pairs by two can be simplified as double-row tapered roller bearing analysis, and the additional moment caused by angular displacement can be ignored.

Figure 10:
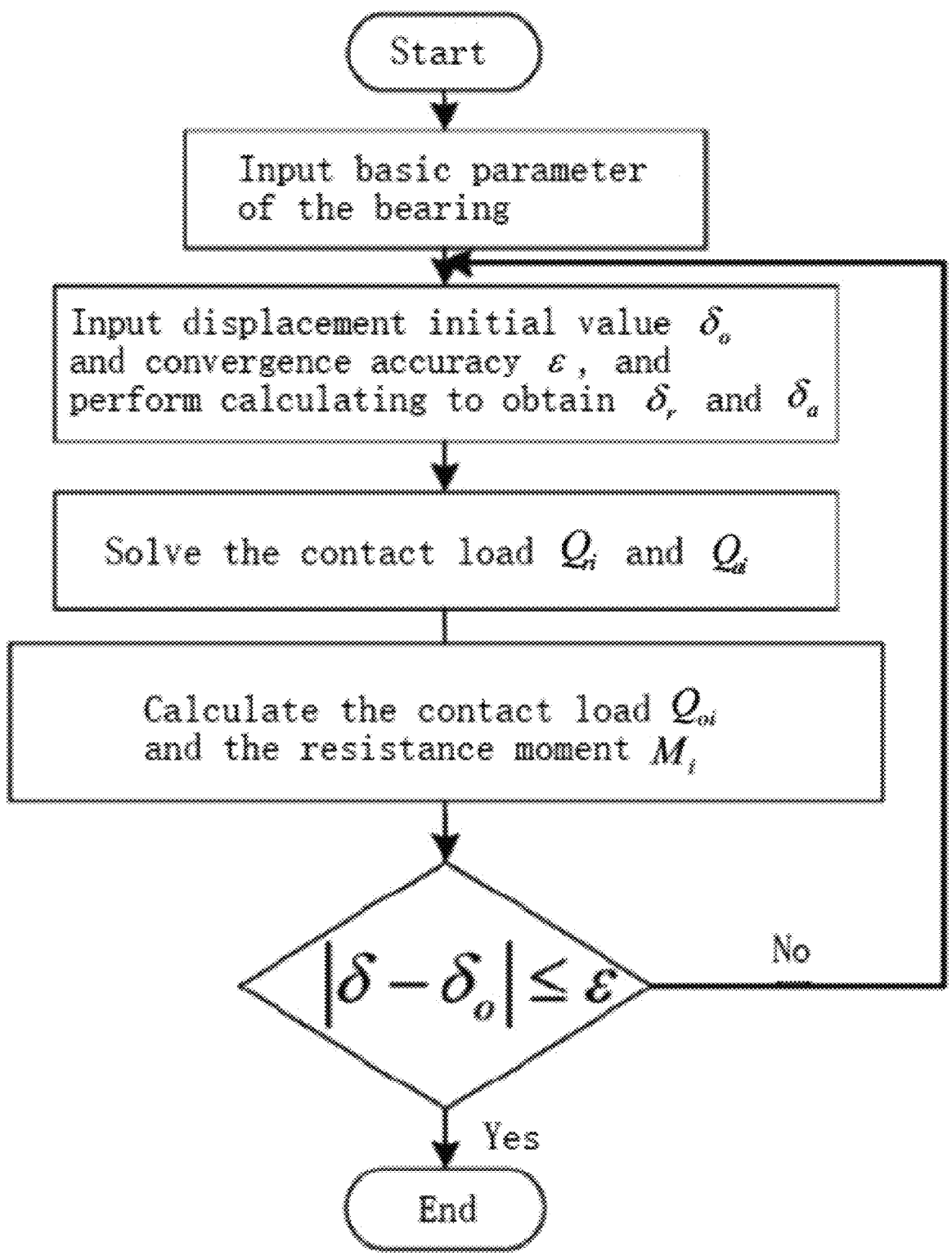
FIG. 10 is a flow chart of the calculation of the Newton-Raphson iteration method adopted by the present invention.
Figure 11:
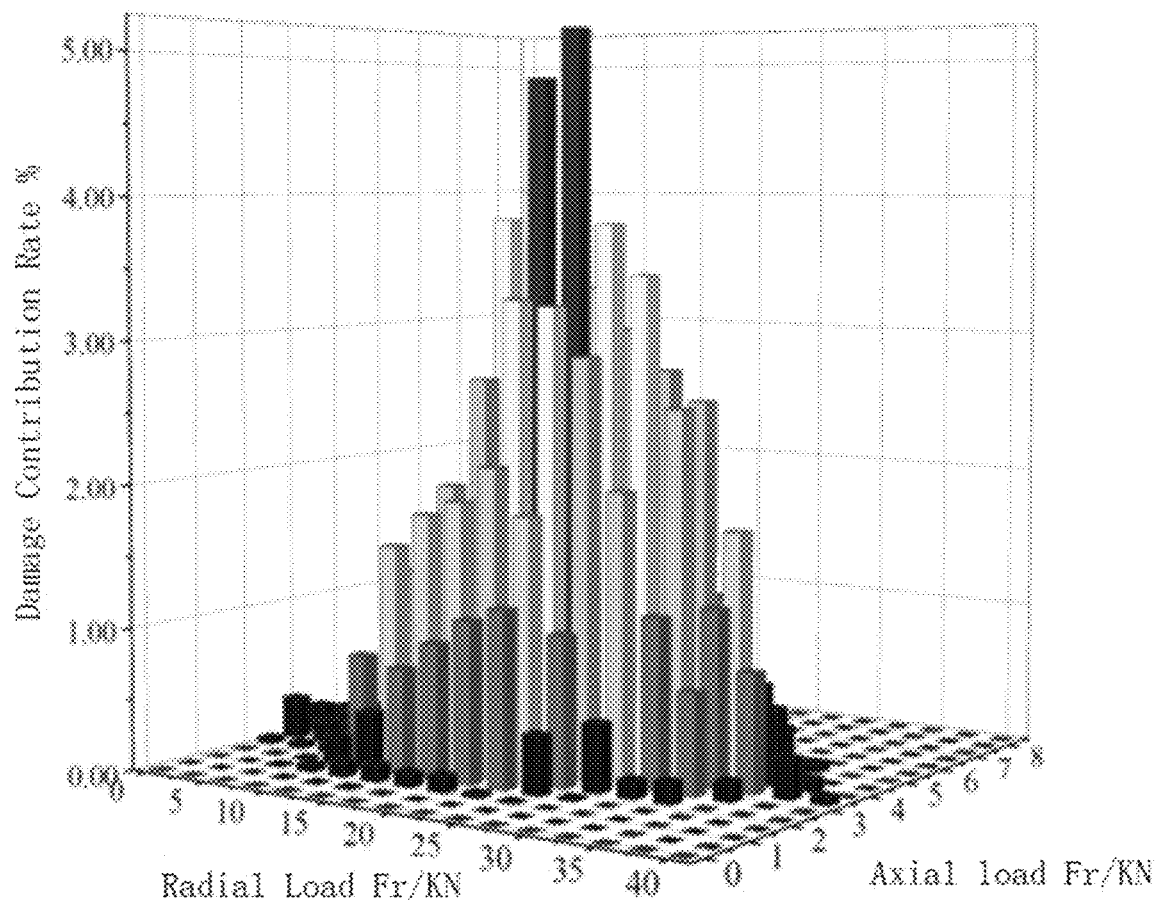
FIG. 11 is a histogram of damage contribution of bearing 1 # in an embodiment of the present invention.
Figure 12:
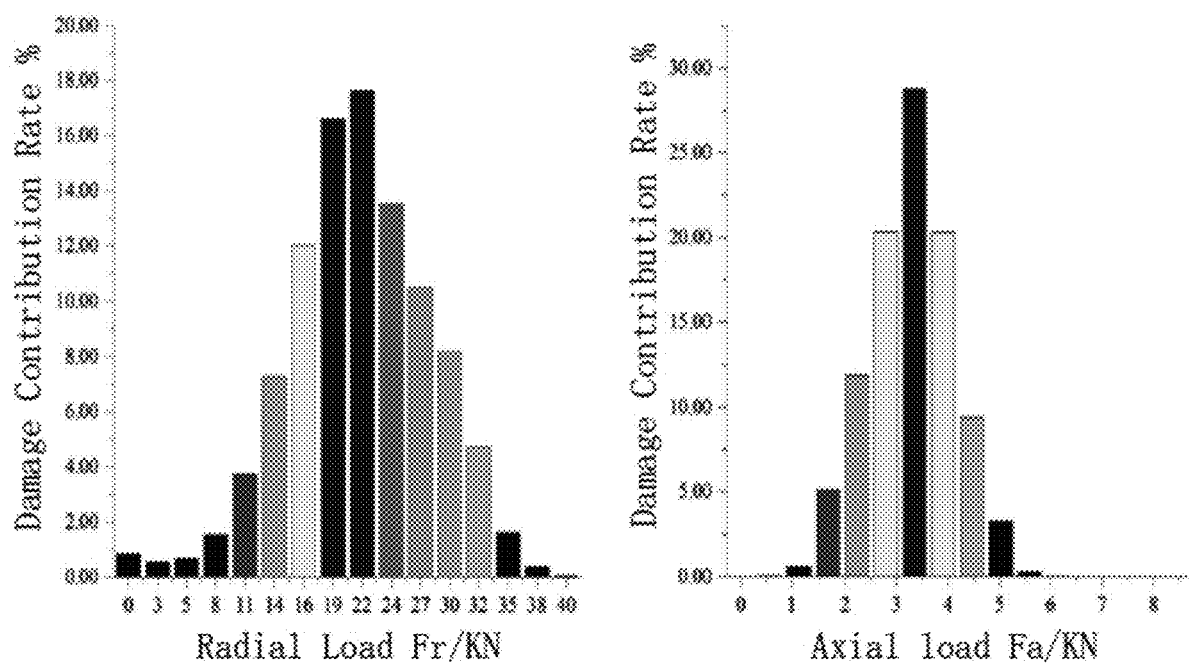
FIG. 12 is a histogram of damage contribution of bearing 1 # under different radial and axial loads according to an embodiment of the present invention.
Figure 13:
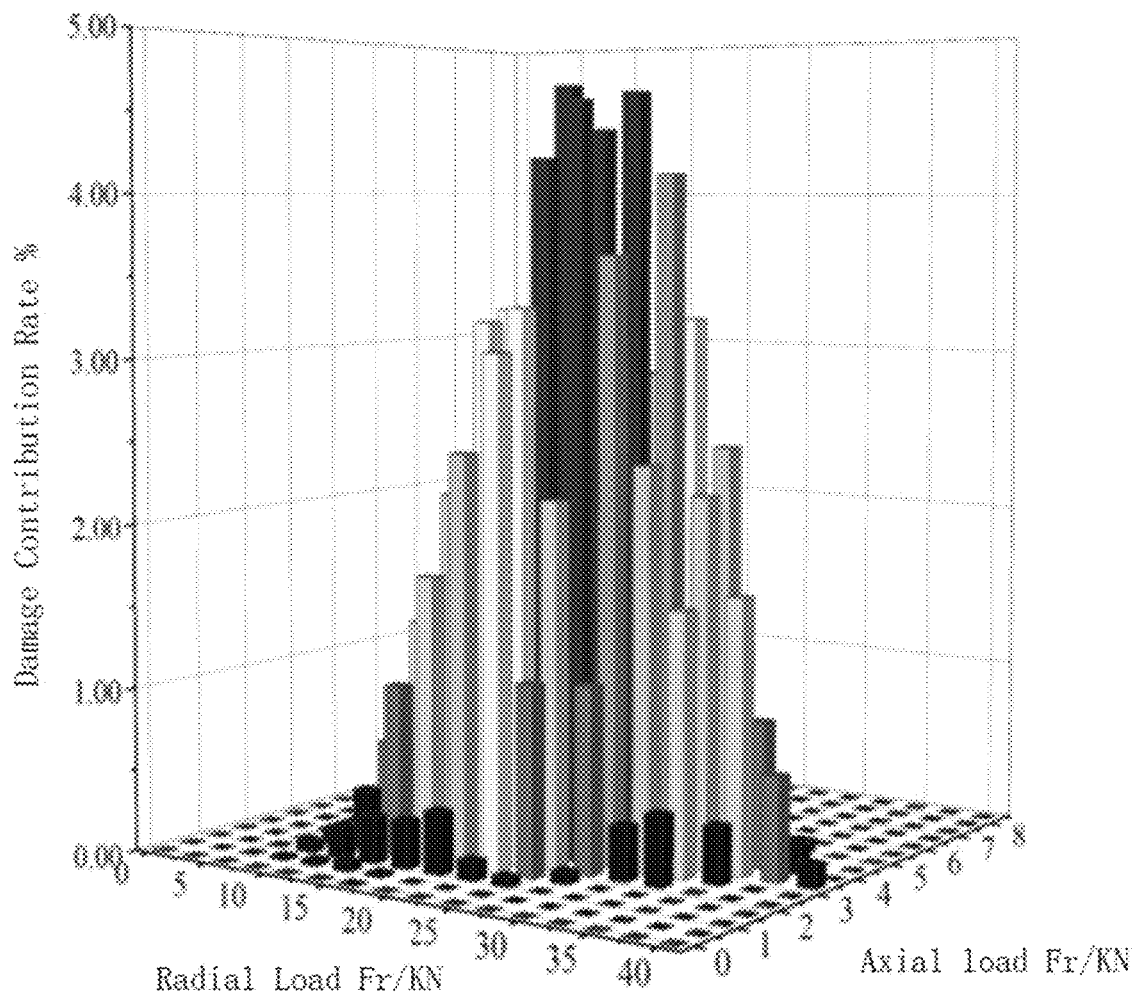
FIG. 13 is a histogram of damage contribution of bearing 2 # in an embodiment of the present invention.
Figure 14:
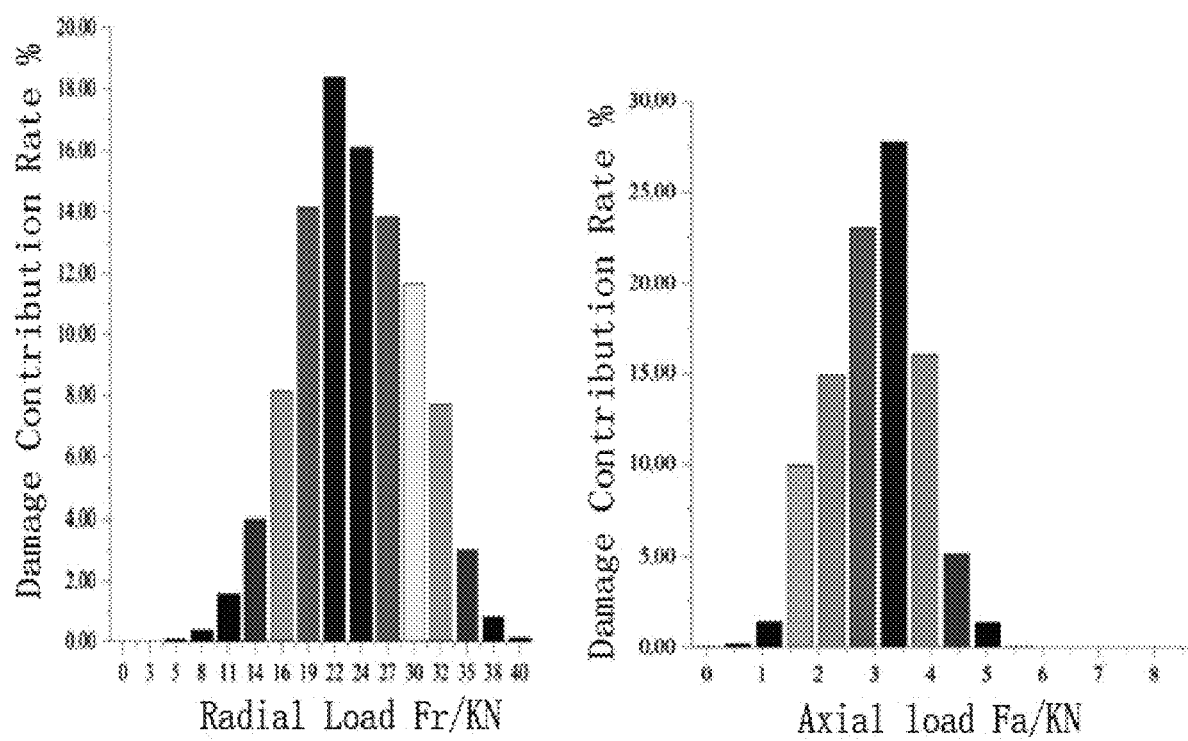
FIG. 14 is a histogram of damage contribution of bearing 2 # under different radial and axial loads in an embodiment of the present invention.

Therefore, the equilibrium equation of tapered roller bearing under external load radial force $F_r$, axial force $F_a$ and bending moment M is:

$$F_r - \sum_{i=1}^{2}\sum_{j=1}^{Z} Q_{rij} = 0 \quad (28)$$

$$F_a - \sum_{i=1}^{2}\sum_{j=1}^{Z} Q_{aij} = 0 \quad (29)$$

$$M - \sum_{i=1}^{2}\sum_{j=1}^{Z} M_j = 0 \quad (30)$$

where: $Q_{rij}$ is the roller-raceway contact load at different angular positions in the radial direction: r denotes the radial direction, i is the bearing number, and j is the roller number; $Q_{aij}$ is the roller-raceway contact load at different angular positions in the axial direction; Z is the number of rollers, and i=1, 2 respectively represent two single-row tapered roller bearings;

Equations (28) and (29) are non-linear equations on $\delta_r$ and $\delta_a$, the load working condition data after importing the joint distribution is solved by using the Newton-Raphson iteration method programming and the specific calculation flow is as shown in FIG. 10. Specifically, $Q_{rij}$ and $Q_{aij}$ are functions of $\delta_r$ and $\delta_a$, and the $\delta_r$ and $\delta_a$ results are obtained by inputting a small initial value such as [0.01, 0.01] during the iterative calculation; if the error accuracy of the final iteration result does not meet the set value (typically 1.0e-6), the initial value is adjusted until the convergence accuracy is met.

Then, according to the obtained $\delta_r$, $\delta_a$, they are substituted into equations (12), (13), (23), and (24) to output the numerical value of bearing contact load.

If the value of $\delta_{ni}$ is negative, which means that the roller is disengaged from the raceway, i. e. there is no contact load, then is reset to 0 and substituted into the calculation.

Finally, the resistance moment $M_i$ is obtained by substituting the equation (30), wherein only bearing 1 # is subjected to a bending moment, and the step of calculating the resistance moment can be omitted when solving bearing 2 #.

S4, calculating the equivalent dynamic load and life of the bearing according to the actual contact load of the bearing to obtain the total equivalent damage of the bearing, and obtaining the equivalent damage of the bearing under a single cycle and the number of bearing failure cycles according to the total equivalent damage of the bearing, thereby obtaining the actual service life of the hub bearing. In the calculation of hub bearing life and damage of the present invention, an improved ISO standard based on Lundberg-Palmgren bearing life theory is adopted which can determine the equivalent dynamic load of the bearing according to the actual contact load of the bearing roller, which is more reasonable than the traditional method, and the calculated bearing life is more conservative.

S41, according to the bearing rated life theory, the rated life $L_{10}$ of tapered roller bearing at 90% reliability is:

$$L_{10} = \left(L_\mu^{-\frac{9}{8}} + L_v^{-\frac{9}{8}}\right)^{-\frac{8}{9}} \quad (31)$$

where: $L_\mu$ is the fatigue life of the bearing inner raceway, specifically:

$$L_\mu = \left(\frac{Q_{c\mu}}{Q_{e\mu}}\right)^4 \quad (32)$$

$L_v$ is the fatigue life of the bearing outer raceway, specifically:

$$L_v = \left(\frac{Q_{cv}}{Q_{ev}}\right)^4 \quad (33)$$

where: $Q_{c\mu}$ and $Q_{cv}$ are the basic rated dynamic loads of the inner raceway and outer raceway, respectively, and the calculation formula is:

$$Q_c = b_m 552\lambda \frac{(1 \mp \gamma)^{29/27}}{(1 \pm \gamma)^{1/4}} \left[\frac{\gamma}{\cos\alpha}\right]^{2/9} D_w^{29/27} l^{7/9} Z^{-1/4} \quad (34)$$

where: $\mp$ and $\pm$ symbols represent the rated dynamic loads of the inner ring and outer ring; when the two symbols are "−" and "+", respectively, the rated dynamic load $Q_{c\mu}$ of the inner ring of the bearing can be calculated according to equation (34), specifically:

$$Q_{c\mu} = b_m 552\lambda \frac{(1-\gamma)^{29/27}}{(1+\gamma)^{1/4}} \left[\frac{\gamma}{\cos\alpha}\right]^{2/9} D_w^{29/27} l^{7/9} Z^{-1/4} \quad (35)$$

when the two symbols are "+" and "−" respectively, the rated dynamic load $Q_{cv}$ of the outer ring of the bearing can be calculated by formula (34), specifically:

$$Q_{cv} = b_m 552\lambda \frac{(1+\gamma)^{29/27}}{(1-\gamma)^{1/4}} \left[\frac{\gamma}{\cos\alpha}\right]^{2/9} D_w^{29/27} l^{7/9} Z^{-1/4} \quad (36)$$

$b_m$ is the correction factor of the rated life, the tapered roller bearing taking 1.1; $\lambda$ is the correction factor introduced for correcting the roller edge load and stress concentration, which is 0.38-0.8; $\gamma$ is an intermediate variable of life calculation, which is determined by the geometric parameter of the bearing; $D_w$ is the roller diameter; l is the roller length; Z is the number of rollers.

$Q_{e\mu}$ and $Q_{ev}$ are the equivalent dynamic loads of inner raceway and outer raceway, respectively, and the calculation formula is:

$$Q_{e\mu} = \left(\frac{1}{Z}\sum_{j=1}^{j=Z} Q_j^4\right)^{1/4} \quad (37)$$

$$Q_{ev} = \left(\frac{1}{Z}\sum_{j=1}^{j=Z} Q_j^{4.5}\right)^{1/4.5} \quad (38)$$

where: $Q_j$ is the contact loads of the different rollers.

S42, bearing fatigue failure is typical damage accumulating process, and for cyclic loads during which the bearing changes over time, the calculation is carried out by adopting the Palmgren-Miner linear cumulative damage rule, specifically as follows: the bearing is under the operating condition that the equivalent dynamic load is $P_1$, and the life of the raceway is $L_1$; if $N_1$ rotations are operated under this working condition, the equivalent damage of the bearing under $P_1$ operating condition is:

$$D_1 = \frac{N_1}{L_1};$$

if the bearing experiences a random road load and operates $N_1, N_2 \ldots N_n$ rotations under the equivalent load of $P_1, P_2 \ldots P_n$ successively, the damage D caused by the random road load to the bearing is:

$$D = \sum_{i=1}^{n} D_i = \sum_{i=1}^{n} \frac{N_i}{L_i} \quad (39)$$

where: n is a set of operating conditions of the bearing, and corresponding to each operating condition i, the fatigue life corresponding to the bearing is $L_i$ rotations; but under this operating condition, the bearing only operates $N_i$ rotations, $N_i < L_i$, and when $D_i = 1$, the bearing fails; D is the damage caused by the bearing in a single cycle.

In the present embodiment, the damage contribution degree under the joint load of bearing 1 # and bearing 2 # is calculated as shown from FIG. 11 to FIG. 14:

The load contributing greatly to the bearing 1 # damage is mainly concentrated in the radial load: the axial load corresponding to 16172-26851N ranging between 2231-3346N.

The load contributing greatly to the bearing 2 # damage is mainly concentrated in the radial load: the axial load corresponding to 18842-29512N ranging between 1115-3904N.

From formula (39), the damages caused by a single cycle in the test field to bearing 1 and bearing 2 are $1.1\times10^{-3}$ and $4.30\times10^{-5}$, respectively. Assuming that the Miner's theoretical correction factor is a=1, i. e. when the damage reaches 1, the bearing fails, the single-round traveling distance of the test field is l=4667 m, so the cycle traveling distance $L_{10}{}^l$ of the hub bearing in the test field at 90% reliability is:

$$L_{10}^l = \frac{a}{D}l \quad (40)$$

where: l is the mileage of the single-round test field.

The number of cycles k of the bearing thus obtained is:

$$k = \sum_{i=1}^{n} \frac{a}{D_i} \quad (41)$$

According to the calculation, when the damage to the hub bearing reaches 1, bearing 1 # life is 909 cycles, corresponding to the test field mileage $L_{10}{}^l$=4242 km; bearing 2 # life is 23256 cycles, corresponding to the test field mileage $L_{10}{}^l$=108535 km. The strengthening factor between the strengthened road condition and the general road condition of the test field is 25. By converting the minimum cycle times, and multiplying the strengthened traveling mileage by the strengthening factor, it can be obtained that the safe traveling mileage of the bearing 1 # is 106,000 km and the safe traveling mileage of the bearing 2 # is 2713,000 km when driving on the general road.

The above-mentioned embodiments only describe the preferred mode of the present invention, and do not limit the scope of the present invention. Without departing from the design spirit of the present invention, those of ordinary skills in the art can make various variations and improvements to the technical solutions of the present invention and the variations and improvements should fall within the scope determined by the claims of the present invention.

The invention claimed is:

1. A method for rapid assessment of service life of a hub bearing based on multiaxial random road loading, characterized by comprising steps as below:

acquiring a measured load spectrum of a wheel center of an automobile, and converting wheel center load into an axial load and a radial load borne by a hub unit;

performing load level division on the axial load and radial load borne by the hub unit, and performing joint distribution counting;

according to a deformation coordination relationship between a bearing roller and a raceway, establishing a bearing contact model under a joint load, and according to the bearing contact model and a result of the joint distribution counting, calculating actual contact load of the bearing under the axial load and the radial load;

and calculating an equivalent dynamic load and life of the bearing via the actual contact load of the bearing, obtaining equivalent total damage of the bearing, and calculating an actual service life of the bearing according to the equivalent total damage of the bearing.

2. The method for rapid assessment of service life of a hub bearing based on multiaxial random road loading according to claim 1, characterized in that a method for converting the wheel center load into the axial load and radial load borne by the hub unit is that: a vehicle coordinate system is constructed, according to a direction of the vehicle coordinate system, x and z direction loads borne by a wheel are combined into the radial load borne by the hub unit, y direction loads borne by the wheel are combined into the axial load borne by the hub unit, and a bending moment caused by the radial load on the bearing is calculated at the same time.

3. The method for rapid assessment of service life of a hub bearing based on multiaxial random road loading according to claim 1, characterized in that a specific method for the load level division comprises: according to a magnitude of the radial load and axial load borne by the bearing, equally dividing the radial load and axial load borne by the bearing into several load levels.

4. The method for rapid assessment of service life of a hub bearing based on multiaxial random road loading according to claim 1, characterized in that a process of the joint distribution counting is: equally dividing the axial load and the radial load into several load levels, and counting an action frequency of the axial load and the radial load under different load levels.

5. The method for rapid assessment of service life of a hub bearing based on multiaxial random road loading according to claim 1, characterized in that a construction method for the contact model of the bearing is: according to the deformation coordination relationship between a roller and a raceway of the bearing, and an angular displacement of the roller and a dislocation of the raceway under an action of bending moment, establishing an equilibrium equation of tapered roller bearing under the action of external load radial force and axial force and bending moment.

6. The method for rapid assessment of service life of a hub bearing based on multiaxial random road loading according to claim 1, characterized in that a calculation process of the actual contact load is: inputting the result of the joint distribution counting into the contact load calculation model, and adopting a numerical value iteration method to solve the contact load calculation model to obtain the actual contact load of the bearing under different loads.

7. The method for rapid assessment of service life of a hub bearing based on multiaxial random road loading according to claim 1, characterized in that the equivalent dynamic load and the life are calculated using a modified Lundberg-Palmgren bearing life theoretical method.

8. The method for rapid assessment of service life of a hub bearing based on multiaxial random road loading according to claim 1, characterized in that a calculation method for the bearing equivalent total damage is that: under a condition of a certain equivalent dynamic load, the equivalent damage of the bearing is calculated according to the life of a bearing raceway and the number of operating rotations of the bearing; based on the bearing equivalent damage, the bearing equivalent total damage is calculated using linear damage accumulation theory.

9. The method for rapid assessment of service life of a hub bearing based on multiaxial random road loading according to claim 1, characterized in that the load spectrum of the wheel center of an automobile is obtained by measuring with a six-component force meter installed on a vehicle.

* * * * *